July 16, 1940.  C. A. BAILEY  2,208,444
APPARATUS FOR REGULATING VISCOSITY
Filed May 27, 1937
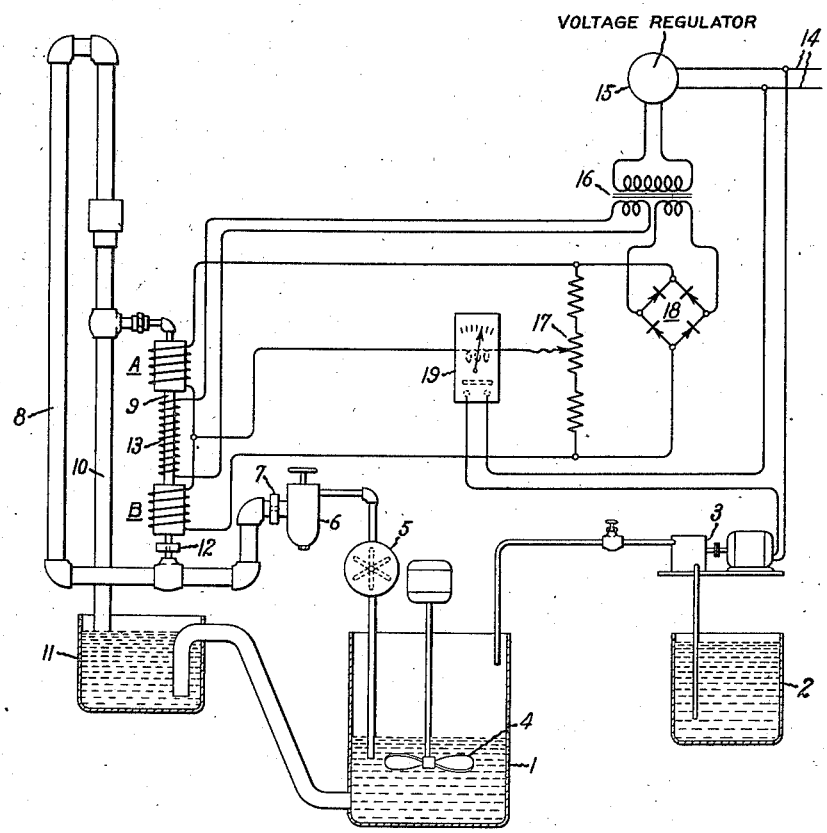
Inventor:
Carl A. Bailey,
by Harry E. Dunham
His Attorney.

Patented July 16, 1940

2,208,444

UNITED STATES PATENT OFFICE 2,208,444

APPARATUS FOR REGULATING VISCOSITY

Carl A. Bailey, Scotia, N. Y., assignor to General Electric Company, a corporation of New York Application May 27, 1937, Serial No. 145,062

5 Claims. (Cl. 137—78)

My invention relates to the regulation of viscosity and more particularly to a novel apparatus for regulating automatically the viscosity of a fluid.

Viscosity may be defined as the resistance offered by a fluid to the relative motion of its particles. There are many industrial processes in which it is desirable not only to know but to control within close limits the viscosity of a fluid. For example, in coating electric wire with enamel insulation the thickness of the enamel coating varies with the viscosity of the enamel when it is applied. In order to have a uniform coating and so as not to waste enamel, it is therefore highly desirable that the enamel viscosity be regulated automatically to a substantially constant value.

To this end enamel viscosity has heretofore been measured indirectly by considering that the density or specific gravity of the enamel was proportional to its viscosity and measuring directly the density or specific gravity. So long as the viscosity of the enamel was controlled by adding a solvent whose density differed considerably from the density of the enamel, the density of the mixture gave a fairly reliable indication of viscosity. However, present day solvents may have almost exactly the same density as the enamel itself so the density of the mixture or product is no longer a reliable index of its viscosity. Furthermore density and viscosity do not usually change similarly with temperature changes so that a temperature error occurred in such arrangements.

Viscosity may also be measured directly by measuring the resistance to the motion or rotation of a paddle or vane immersed in the fluid whose viscosity is in question. However, I have found that in practice this is not very reliable because the effect of eddies in the fluid and of the interaction of the eddies on baffles provided for minimizing their effect often cause a reverse indication to occur. That is to say, the less viscous the fluid the more resistance there appears to be to its motion or rotation.

In practicing my invention, I first make the flow of the fluid proportional to its viscosity and then I measure the flow and obtain therefrom indirectly an indication of viscosity. This method is particularly adapted to measuring the viscosity of constant density fluid because by passing such a fluid through a measured opening or orifice under constant head the flow will be directly proportional to viscosity. However, my invention is not limited to constant density fluids and so long as the fluid pressure at the orifice is kept constant by any well known means, the viscosity of variable density fluids may readily be measured in accordance with my invention. The flow may be measured in any well known manner either by direct observation or by means of any well known flow meter.

An object of my invention is to provide a new and improved automatic viscosity regulator.

My invention will be better understood from the following description taken in connection with the accompanying drawing and its scope will be pointed out in the appended claims.

Referring now to the single figure of the accompanying drawing, wherein I have shown schematically an embodiment of my invention, the fluid whose viscosity it is desired to regulate, and therefore, of course, also to measure, is contained in a tank 1. The viscosity of this fluid is changed by adding variable amounts of a suitable diluent, solvent or other reagent contained in a tank 2. The particular fluid which which I at present practice my invention is wire insulating enamel and the solvent has substantially the same density as the enamel. An electric motor-operated pump 3 and suitable associated piping serves as the means for transferring the solvent from the tank to the main tank 1. The fluid from tank 2 is thoroughly mixed with the fluid in tank 1 by means of a motor driven agitator or propeller 4.

Samples of the fluid in tank 1 are withdrawn therefrom by means of a pump 5 which forces the fluid through a suitable filter 6 and a flow reducing orifice 7. The fluid then has a choice of two parallel paths one of which is through a stand-pipe 8 and the other of which is through a measuring tube 9. Both the stand-pipe and the measuring tube have a common return 10 to a sump 11 from which the fluid drains back to the main tank 1.

The pump 5 delivers the fluid at a pressure sufficient to raise it to the top of the stand-pipe 8, which may be provided at the top with a suitable vent if desired. At the bottom of the measuring tube 9 there is inserted a flow measuring orifice 12. The difference in height between the top of the stand-pipe 8 and the top of the measuring tube 9 determines the net fluid pressure head applied to the entrance of the measuring tube 9 at the orifice 12. I find that a difference in height of two feet is suitable for regulating the viscosity of enamel in the range of 50 to 200 seconds Ford, (No. 1 orifice). This constant head coupled with the constant density of the fluid results in uniform fluid pressure at the orifice 12. It follows, therefore, that the flow of the fluid through the measuring tube is directly proportional to the viscosity of the fluid.

The flow through the tube 9 is measured by the well known principle of applying heat to the fluid flowing through the tube 9 at a constant rate and measuring the temperature difference between the ends of the tube. The arrangement for supplying heat consists of a resistance heater 13 wound on the central part of the measuring tube 9. It is supplied with electric current from a suitable supply circuit 14 through a voltage regulator 15 and a transformer 16. The function of the voltage regulator is to make the energization and consequently the heating effect of the heater constant and independent of the fluctuations in the voltage of the circuit 14 which may be an ordinary 115 volt 60 cycle house supply circuit. The regulator may be of any one of the several well known types, such for example as a regulator operating on the ballast tube principle or a regulator operating on the principle of magnetic saturation.

The arrangement for measuring the temperature difference between the ends of the measuring tube consists essentially of a Wheatstone bridge circuit, two of the arms of which are resistors A and B wound respectively around the hot and cold ends of the measuring tube. The other two arms of the bridge consist of the two halves of an adjustable rheostat 17. The bridge is energized with direct current obtained from an auxiliary secondary winding on the transformer 16 by means of a rectifier 18. The output terminals of the bridge consist of a point intermediate the resistors A and B and the adjusting arm on the rheostat 17, and between these points is connected a combination indicator and controller 19 provided with a dial and pointer and also provided with a set of contacts for controlling the starting and stopping of the solvent pump 3.

The operation is as follows: The rheostat 17 is adjusted so that the ratio of the resistances of its upper and lower sections correspond respectively to the ratio of resistances A and B at any particular value of flow and hence viscosity. The resistances A and B will differ because of the difference in temperature. If now the viscosity of the fluid increases for any reason it will flow more slowly through the measuring tube. This will cause it to receive more heat so that there will be a greater temperature difference between its upper or hot end and its lower or cold end. If resistances A and B have positive temperature coefficients of resistance this will mean that A's resistance will increase relative to B's resistance thereby unbalancing the bridge and causing the controller 19 to start the solvent pump. The addition of solvent will, of course, dilute the enamel and lower its viscosity. This in turn will increase the flow through the tube 9 thereby decreasing the temperature difference between the ends of the measuring tube and reestablishing the balance of the bridge circuit, whereupon the contacts of the controller 18 will open and stop the addition of solvent.

If it is desired to change the viscosity setting of the regulator, it is merely necessary to change the setting of the rheostat 17.

This regulator operates very well when the temperature of the enamel remains substantially constant. If, however, the temperature of the enamel falls, its viscosity increases and the regulator automatically acts to add a considerable amount of solvent. When this enamel having the large amount of solvent is baked on the wire the excess solvent evaporates and leaves too thin an enamel coating.

In order to correct for this objection, I make the resistance A of a material having a higher temperature coefficient than resistance B. In other words, the top resistance A may be made of nickel while the cold resistance B may be made of copper. As a result of this, the resistance change of A in response to the flow of lower temperature enamel through tube will be greater than the resistance change of the cold resistance B. Therefore, a biasing effect is provided in the operation of the regulator which makes it act as though the viscosity has not increased as much as it actually has and consequently, as much solvent is not added as would be the case if the resistors A and B were made of the same material.

While I have shown and described a particular embodiment of my invention, it will be obvious to those skilled in the art that changes and modifications can be made therein without departing from my invention and I therefore aim in the appended claims to cover all such changes and modifications as fall within the true spirit and scope of my invention.

What I claim as new and desire to secure by Letters Patent of the United States, is:

1. Apparatus for automatically regulating the viscosity of a fluid, said apparatus including means for producing a flow of said liquid which is proportional to its viscosity, a device for measuring said flow, means controlled by said measuring device for adding to said fluid a liquid of different viscosity but of the same density, said flow measuring device including means for automatically changing its setting in accordance with changes in temperature of the fluid whereby changes in viscosity resulting from changes in temperature are compensated for.

2. In a fluid viscosity regulating system, a flow measuring arrangement comprising a pair of elements of an electrical bridge which are responsive respectively to the temperature of a fluid stream before and after it receives heat at a uniform rate, said elements being made of materials having different temperature coefficients of resistance whereby changes in temperature of the fluid before it receives said heat will vary the setting of the bridge, and means controlled by said bridge for varying the viscosity of the fluid whose flow is measured.

3. An automatic insulating enamel viscosity regulator comprising in combination, a tank adapted to contain insulating enamel, a tank adapted to contain solvent for said enamel having substantially the same specific gravity as said enamel, a fluid pump having its inlet in said enamel, a vertical stand pipe and a vertical flow measuring tube which is shorter than said stand pipe connected in parallel to the outlet of said pump, a common return conduit for said stand pipe and said flow measuring tube, a heating coil wound substantially centrally on said flow measuring tube, separate resistance coils wound at each end of said tube, an electrical bridge circuit including said resistance coils as two arms thereof, an electroresponsive device controlled by said bridge, a pump for transferring said solvent from the solvent container to the enamel tank, said pump being controlled by said electroresponsive device, and a supply circuit for energizing said heating coil and said bridge.

4. In an automatic system for regulating the proportions of a mixture of liquids of different viscosities, particularly liquids of substantially the same density, which is consumed in an industrial process, the combination of a device for measuring the viscosity of the mixture, means controlled by said device whenever the viscosity of the mixture is beyond a predetermined value for changing the relative proportions of said mixture, and means responsive to changes in temperature of the mixture for varying the predetermined value of viscosity at which the relative proportions of the mixture are changed.

5. In an automatic system for regulating the proportions of a mixture of wire insulating enamel and thinning solvent of substantially the same density, a device for measuring the viscosity of the mixture, means controlled by said device whenever the viscosity of said mixture exceeds a predetermined value for adding thinning solvent to the mixture, and means included in said viscosity measuring device for varying said predetermined value of viscosity inversely with changes in the temperature of said mixture.

CARL A. BAILEY.